US008424062B2

(12) United States Patent
Sanchez et al.

(10) Patent No.: US 8,424,062 B2
(45) Date of Patent: Apr. 16, 2013

(54) ADVANCED ACCESS CONTROL FOR MEDICAL AD HOC BODY SENSOR NETWORKS

(75) Inventors: David S. Sanchez, Terrassa Barcelona (ES); Heribert Baldus, Aachen (DE); Oscar Garcia, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1058 days.

(21) Appl. No.: 12/305,436

(22) PCT Filed: Jun. 19, 2007

(86) PCT No.: PCT/US2007/071548
§ 371 (c)(1),
(2), (4) Date: Dec. 18, 2008

(87) PCT Pub. No.: WO2007/149848
PCT Pub. Date: Dec. 27, 2007

(65) Prior Publication Data
US 2009/0205022 A1 Aug. 13, 2009

Related U.S. Application Data

(60) Provisional application No. 60/805,491, filed on Jun. 22, 2006.

(51) Int. Cl.
*H04L 29/06* (2006.01)
(52) U.S. Cl.
USPC .............................. 726/4; 600/300; 455/406
(58) Field of Classification Search .................. None
See application file for complete search history.

(56) References Cited

U.S. PATENT DOCUMENTS

| 7,234,063 | B1 * | 6/2007 | Baugher et al. ............... 713/189 |
|---|---|---|---|
| 7,644,089 | B2 * | 1/2010 | Stewart et al. ................. 707/781 |
| 7,965,845 | B2 * | 6/2011 | Baldus et al. .................. 380/279 |
| 8,024,573 | B2 * | 9/2011 | Westhoff et al. ............... 713/179 |
| 2005/0140964 | A1 | 6/2005 | Eschenauer et al. |
| 2005/0223008 | A1 * | 10/2005 | Kubota et al. ...................... 707/9 |
| 2006/0023887 | A1 | 2/2006 | Agrawal et al. |
| 2006/0090199 | A1 | 4/2006 | Okano |
| 2006/0155583 | A1 | 7/2006 | Teshima et al. |
| 2006/0218394 | A1 * | 9/2006 | Yang .............................. 713/167 |
| 2008/0034438 | A1 * | 2/2008 | Mireku ........................... 726/27 |

FOREIGN PATENT DOCUMENTS

| CN | 1399938 A | 3/2003 |
|---|---|---|
| JP | 08087454 A | 4/1996 |
| JP | 2005303700 A | 10/2005 |
| WO | 9840992 A2 | 9/1998 |
| WO | 0000881 A1 | 1/2000 |
| WO | 2005057876 A1 | 6/2005 |
| WO | 2006003532 A1 | 1/2006 |

(Continued)

OTHER PUBLICATIONS

Mehta, et al., "RINK-RKP: A Scheme for Key Predistribution and Shared-Key Discovery in Sensor Networks", 24th IEEE Int'l. Performance, Computing & Communications Conf., 2005 pp. 193-197, Apr. 7-9, 2005.

(Continued)

*Primary Examiner* — Fikremariam A Yalew (57) ABSTRACT

A secure wireless network (2) includes a network (22, 24, 26) that includes one or more wireless nodes (7, 8, 10, 12, 14, 16, 18, 20). A list (5) includes security metadata, which describes access rights or groups of access rights granted to an entity within the wireless network (2) or groups of entities within the wireless network (2).

24 Claims, 5 Drawing Sheets

FOREIGN PATENT DOCUMENTS

| WO | WO-2006/003532 | * | 1/2006 | ............ 12/56 |
| WO | 2006051462 A1 | | 5/2006 | |

OTHER PUBLICATIONS

Morchón, et al., "Resource-Efficient Security for Medical Body Sensor Networks" Proc. of the Int'l Workshop on Wearable & Implantable Body Sensor Networks (BSN '06), 2006, pp. 80-83, Apr. 3-5, 2006.

Sanchez, D. S., et al.; A Deterministic Pairwise Key Pre-distribution scheme for Mobile Sensor Networks; 2005; IEEE Trans. on Security and Privacy for Emerging Areas in Communications Networks; pp. 277-288.

* cited by examiner

ADVANCED ACCESS CONTROL FOR MEDICAL AD HOC BODY SENSOR NETWORKS

CROSS REFERENCE TO RELATED APPLICATIONS

This application claims the benefit of U.S. provisional application Ser. no. 60/805,491 filed Jun. 22, 2006, which is incorporated herein by reference.

The following relates to wireless networks. It finds particular application with the establishment of secure communication of information within a wireless body sensor network. However, it is to be appreciated that the following may also find application in providing secure communication between other wireless devices and other wireless transponders.

Body sensor networks (BSNs) have received attention for medical applications and are generally used for patient care and monitoring. A BSN includes data-collection nodes and optionally control nodes. Sensor nodes are battery powered, have limited computational capabilities and memory and rely on intermittent wireless communication via radio frequency or body coupled communication (BCC). Conventionally, a large group (e.g., thousands) of interconnected and interoperable nodes are deployed in a medical area, such as a hospital. Subsets of sensor nodes are joined to form different individual BSNs.

Each BSN is usually composed of a small subset (typically from 2 to 50 nodes) of all the nodes. For example, a particular BSN can be created to monitor an individual patient in a medical area. A priori, the size and membership of a BSN is unknown: BSN nodes may be present at the moment of BSN formation or may be added and deleted subsequently. Some nodes may have limited mobility after formation of the BSN and others may be highly mobile and often can belong to various different BSNs formed in the same area (e.g., data collection and control nodes carried by human users, sensors worn by persons, etc.). Yet other nodes might be left unattended. The lifetime of a BSN may vary from a few days, to several weeks, or even months, as dictated by the particular function served and the patient's needs.

BSNs are often formed in public (e.g., the hospital realm) or hostile areas where communication between nodes in a system, and specifically in BSNs, can be surreptitiously monitored by unscrupulous individuals. Therefore, limiting access to BSNs to authorized clinicians only is of critical importance. Additionally, maintaining security is compulsory based on various government regulations, such as the Health Insurance Portability & Accountability Act of 1996 (HIPAA) in the United States, which requires the security and confidentiality of individually identifiable, protected health information.

Typically, security services for BSNs include authenticating that the requesting device has the correct reciprocal key or other code necessary to join the network. Once the device joins the network, the device has access to all of the nodes. Due to the continuously changing environment in which such BSNs are employed, the individuals (or groups of individuals), authorized with the access to the BSN, could also continuously change. Therefore, the ad hoc nature of BSNs and the operational requirements of BSNs make typical online server-based solutions known in the art inappropriate.

The present application contemplates an improved apparatus and method that overcomes the aforementioned limitations and others.

In accordance with one aspect, a method for using a secure nodal network is disclosed. The method verifies that a requesting entity has the proper access rights to at least a portion of the secure nodal network. The requesting entity is authenticated in accordance to a key pre-distribution scheme. A list including security metadata is queried to determine if the requesting entity has proper access rights. In response to querying results being positive, access is granted to the requesting entity.

In accordance with another aspect, a secure wireless network is disclosed. The secure wireless network includes one or more wireless nodes, and a list including security metadata, the metadata describing access rights or groups of access rights granted to an entity within the wireless network or groups of entities within the wireless network.

In accordance with another aspect, a method of wirelessly monitoring patients in a medical environment is disclosed. One or more sensors are provided to a patient to collect medical data to be monitored, the one or more sensors composing a body sensor network. Access to the body sensor network is allowed to different groups defined by roles, the groups with different roles have different access rights. Each member of the group and the associated role are authenticated prior to allowing access to the body sensor network.

One advantage resides in automatic establishment and management of a security domain configured to protect body sensor networks (BSNs) from unauthorized access.

Another advantage resides in providing the ability to grant sets of access rights to clinicians based on roles, which improves the system's efficiency.

Numerous additional advantages and benefits will become apparent to those of ordinary skill in the art upon reading the following detailed description of the preferred embodiments.

The invention may take form in various components and arrangements of components, and in various steps and arrangements of steps. The drawings are only for purposes of illustrating the preferred embodiments and are not to be construed as limiting the invention.

ADVANCED ACCESS CONTROL SYSTEM AND METHODS

Figure 1:
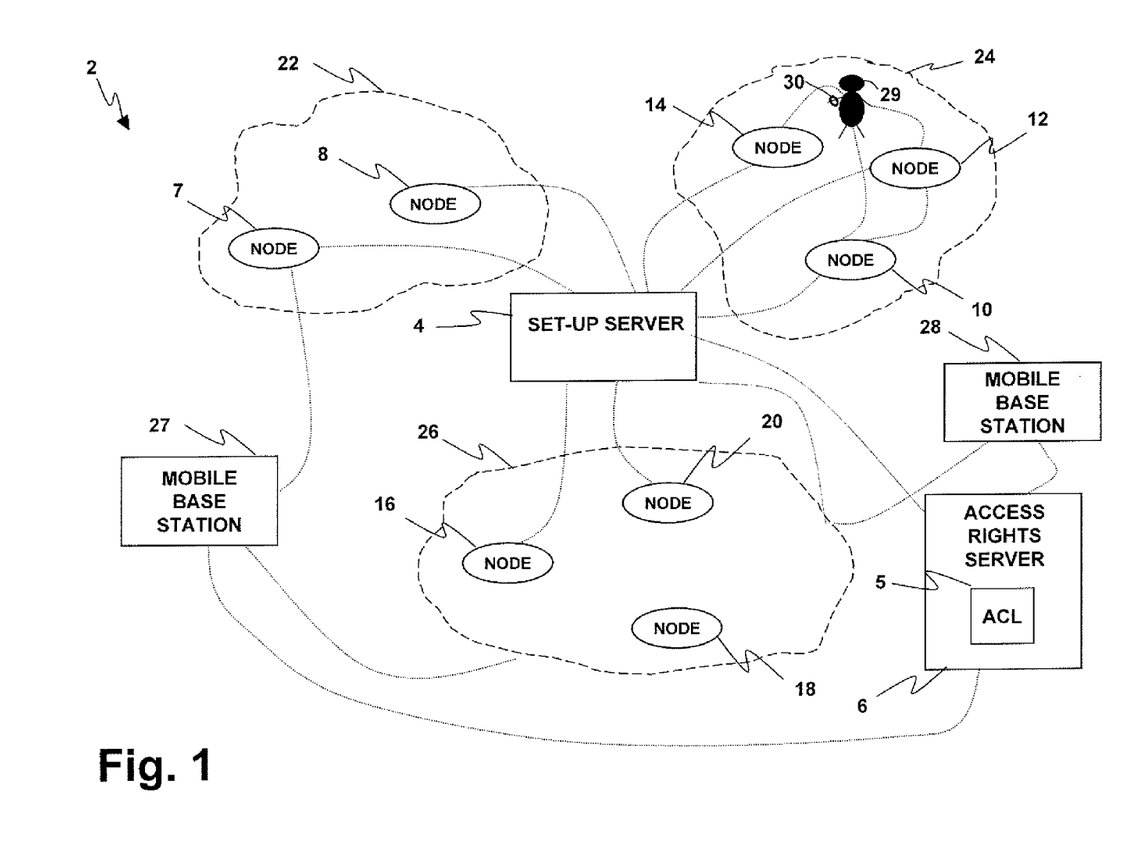
FIG. 1 illustrates a mobile sensor system.

FIG. 1 illustrates one embodiment of a wireless network system 2 that includes a set-up server 4, an authorized clinicians list (ACL) 5, an access rights server 6, a plurality of wireless nodes or devices 7, 8, 10, 12, 14, 16, 18 and 20 such as medical monitors, sensors, computers, PDAs and the like, a plurality of networks 22, 24, and 26 such as body sensor networks, a security server 27 and mobile base stations 27 and 28.

In the example of FIG. 1, the system 2 is shown with all possible interconnections. Not all the interconnections are active at all times. For instance, some interconnections (e.g., between the set-up server 4 and nodes 7, 8, 10, 12, 14, 16, 18 and 20) are active before the nodes are deployed, while other interconnections (e.g., between the mobile base stations 27, 28 and access rights server 6 are active after the nodes are deployed.

The set-up server 4 is a security-dedicated server, which coordinates security based efforts. The nodes 7, 8, 10, 12, 14, 16, 18 and 20 connect to the set-up server 4 in an initial configuration phase (e.g., pre-deployment) before the nodes 7, 8, 10, 12, 14, 16, 18 and 20 are enabled for use. The set-up server 4 typically resides in a physically protected perimeter and is only accessible to authorized personnel. The set-up server 4 distributes to the nodes 7, 8, 10, 12, 14, 16, 18 and 20 symmetric keys or other codes that enable the nodes in each network to communicate securely with each other. Other set-up functions include providing a patient identification number to one of the nodes, date or time information, initial settings, such as sensed information reporting frequency or criteria or the like.

For example, the mobile nodes include physiological monitoring devices, controlled medication administration devices, PDA-like devices, embedded computing systems, or the like devices. For example, one network includes nodes for each physiological monitor, medication administration device, computer-based patient ID, attending physician's PDA, and the like. Each mobile node 7, 8, 10, 12, 14, 16, 18 and 20 offers one or more network services. Each node can communicate peer-to-peer with any other node in the network system 10 via transmitting/receiving means to access one or more services. Peer-to-peer communications is preferably unidirectional and bi-directional and can be synchronous and asynchronous. A physician can access the node 7, 8, 10, 12, 14, 16, 18 and 20 to provide a service to the patient, e.g. administer a medication, check a status of the monitoring equipment, and the like, by using a portable computer, PDA, or the like.

For example, the nodes 7, 8, 10, 12, 14, 16, 18 and 20 include sensors configured for collecting and transferring patient medical data, such as pulse rate, blood oxygen levels, blood pressure, and the like. As another example, the nodes 7, 8, 10, 12, 14, 16, 18 and 20 include a node for collecting data from the sensors and transferring the data or selected portions of it to a hospital network. As yet another example, the nodes are incorporated with medical devices such as infusion pumps to monitor and control medication dosage. Any of the nodes 7, 8, 10, 12, 14, 16, 18 and 20 may establish wireless connections with one or more of the other nodes 7, 8, 10, 12, 14, 16, 18 and 20. In many instances, the nodes 7, 8, 10, 12, 14, 16, 18 and 20 are memory, battery, and CPU constrained.

The body sensor networks (BSNs) 22, 24, and 26 include wireless networked nodes, which may be attached to one or more patients 29. The BSNs 22, 24, and 26 are typically bandwidth constrained due to the large number of nodes in the system 2. For example, in a hospital environment, there might be hundreds or thousands of such nodes and hundreds or thousands of the BSNs 22, 24 and 26 (e.g., one or more for each patient). The mobile base stations (MBSs) or devices 27 and 28 are used to access data on and configure BSNs.

The authorized clinicians list (ACL) 5 includes a listing of clinicians that are authorized to access particular portions of the system 2, such as particular BSNs, and more specifically, particular nodes within the BSNs. In one embodiment, the authorized clinicians list 5 is a lookup or a cross-reference table that includes a listing of authorized clinicians. In some embodiments, the authorized clinicians list 5 may be implemented as a flat file, while in others it may be implemented as a table (or series of tables organized in a schema) within a relational database, for example.

The access rights server (ARS) 6 is a security-dedicated server within the system 2, which performs authorized clinicians list lookup based on the requests from the nodes 7, 8, 10, 12, 14, 16, 18 and 20 via the mobile based stations 27, 28. Upon receiving the request, the corresponding authorized clinicians list lookup is performed and the results are directed back to the requesting node 7, 8, 10, 12, 14, 16, 18 and 20 via the corresponding mobile base station 27, 28. In some embodiments, the authorized clinicians list 5 is incorporated with the access rights server 6, while in other embodiments, the authorized clinicians list 5 is incorporated with other appropriate servers, such as the set-up server 4. Accordingly, in environments without the access rights server 6, authorized clinicians list lookups occur directly via the authorized clinicians list 5. In one embodiment, the authorized clinicians list 5 is associated with each patient or a group of patients. For example, the authorized clinicians list 5 is incorporated with a control device 30 associated with each patient.

In one embodiment, secure communications between the nodes and/or the mobile body devices 27, 28 is achieved by utilizing a Deterministic Pairwise Key Pre-Distribution Scheme (DPKPS), which yields a powerful and efficient keying system to provide identification and authentication of nodes in the system, such as sensors, medical mobile devices and clinicians in a hospital. In the deterministic pairwise key predistribution scheme (DPKPS), before deployment of the nodes 7, 8, 10, 12, 14, 16, 18 and 20 (mobile body devices 27, 28), the nodes 7, 8, 10, 12, 14, 16, 18 and 20 (mobile body devices 27, 28) are initialized with a unique device keying material. Each device keying material is unambiguously associated with this device identifier. In operation, any pair of devices 7, 8, 10, 12, 14, 16, 18, 20, 27, 28 with the predistributed keying material can authenticate one another.

In one embodiment, a hierarchical deterministic pairwise key predistribution scheme (HDPKPS) is utilized in which a unique keying material is predistributed to every device 7, 8, 10, 12, 14, 16, 18, 20, 27, 28. Keying material determines L security domains a device belongs to within of an L-level hierarchical infrastructure of security domains. HDPKPS keying material is unambiguously associated to the device identifier. In the operation, any pair of devices can use their keying material to establish a pairwise symmetric key, at least at the highest security level. Particularly, any two devices can establish a pairwise key at a security level k if (i) both devices belong to the same security domain at level k; and (ii) both devices can unambiguously identify each other through the device identifier at level i, $i \leq k$.

In other embodiments, other suitable symmetric key pre-distribution schemes (e.g., Blom, Blundo et al.), may be used as an underlying framework for secure network communication.

In one embodiment, a set of privileges or a role is granted to a clinician or groups of clinicians within the system 2 for accessing the nodes 7, 8, 10, 12, 14, 16, 18 and 20. As described in detail below, use of roles are beneficial because clinicians typically work in teams. When a particular team member receives rights to a particular BSN 22, 24, and 26, the system 2 is configured such that all clinicians belonging to the team may also be granted similar access rights. Further, use of roles increases efficiency in storing security oriented metadata in nodes and other memory constrained devices in the system 2. Further, different roles can have different access rights. For example, physicians may have rights to read data, change monitoring or reporting schedules, change medication doses, and the like. Nurses may have rights to read data only. Technicians may have rights to read battery levels, read monitor self diagnosis outputs, run node diagnostic routines, etc., but be denied access to medical data.

Initial Set-Up of Advanced Access Control System

As used herein, the term role is used to identify a group of individuals performing a similar task, with similar attributes or responsibilities. For instance, in a hospital, some clinicians are identified by the role "doctor." The concept of roles coupled with access rights is used to enforce role-based access control rather than or complementing individual access control, e.g. such advanced access control system enforces both role-based access control and individual access control. In the system 2 roles apply to human users, e.g. clinicians. Access rights are enforced by specific components (e.g., nodes) or groups of components (e.g., BSNs) of the system 2. Specific access rights to nodes, BSNs, etc., is granted to roles.

According to aspects of one embodiment, roles may be created to mirror the categories of clinicians in a hospital. For example, the roles include a "doctor" role, a "nurse" role, and a "medical technician" role to represent the three categories of clinicians in the typical hospital. Considering the associated responsibilities of the three respective categories, for example, the doctor role is associated with the broadest collection of rights, while the nurse role is associated with a different set of rights, and the medical technician role is associated with the narrowest set of rights.

In another embodiment, there may exist roles representing sub-categories that relate to different sections of a hospital, and its corresponding BSNs. For instance, the roles include a "cardiologist" role that provides rights to the appropriate clinicians corresponding to the BSNs related to cardiac patients (e.g., BSNs configured for monitoring the heart), and an internal medicine role which provides the internal medicine doctors with access to the appropriate internal medicine BSNs. In yet another embodiment, the roles are defined on per patient basis. For example, the node, such as a control device wearable by the patient, stores the identification information of the authorized users. For example, one clinician may have a "treating physician" role for one patient, while a "diagnostic physician" role for another. With each role, a different set of access rights applies.

Figure 2:
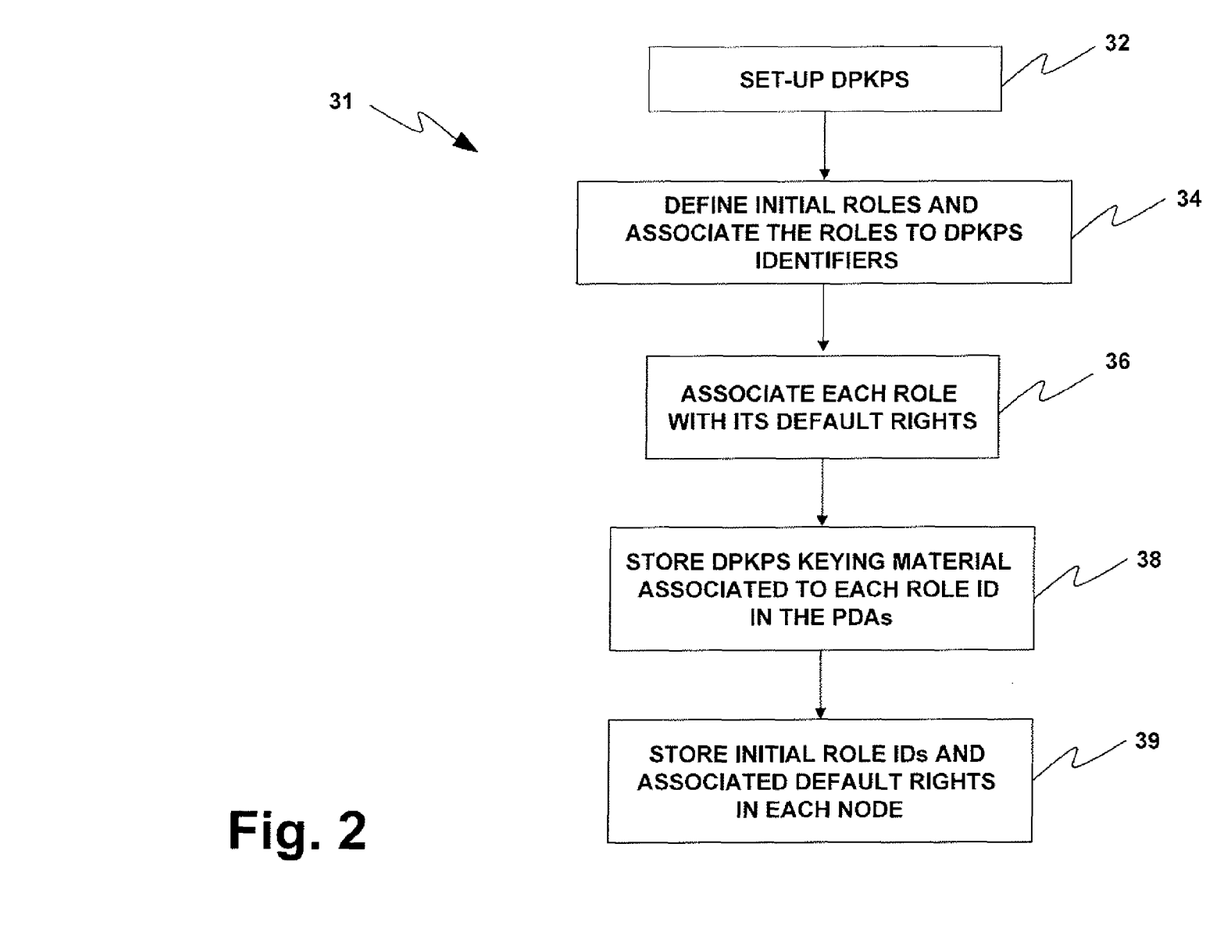
FIG. 2 illustrates a method to perform initial set-up of default roles, in which rights are granted to the roles to provide access to resources in body system networks.

FIG. 2 illustrates a method 31 to perform initial set-up of default roles, in which rights are granted to the roles to provide access to resources in the BSNs 22, 24, and 26. At a step 32, the DPKPS key or other key pre-distribution scheme is used to configure keying material.

At a step 34, initial roles are defined and the newly defined roles are associated with DPKPS identifiers which serve as labels for the roles. For instance, the role doctor is assigned to DPKPS identifier 100 or doctor "Joe Doe" is assigned the DPKPS identifier 23. The roles are identified, authenticated and authorized based on corresponding DPKPS identifiers. At a step 36, each role is associated with default rights to communicate with the components of the system 2.

In one embodiment, each clinician is provided with a device, typically a personal digital assistant (PDA), configured with DPKPS to access the nodes 7, 8, 10, 12, 14, 16, 18 and 20 in the system 2. Generally, PDAs are handheld computers carried by clinicians and are configured for providing wireless access to the nodes 7, 8, 10, 12, 14, 16, 18 and 20 and BSNs 22, 24, and 26 in the system 2. Data are synchronized between PDA and other servers within the system 2 (as discussed in more detail below). In addition, PDAs can also offer e-mail, web browsing and cellular phone service functionality. The term "PDA", as used herein, can also refer to any other suitable device used by clinicians to access BSNs 22, 24, and 26 within the system 2, including devices that are portable and wearable. Of course, it is also contemplated that other devices which allow docking communications with the PDAs are used.

To handle the occurrence of a lost or stolen PDA, the PDA's operating system in one embodiment is configured to self-lock the device and require a specific password for access to the PDA. Further, the various servers and nodes of the system 2 can be configured with additional security features well known in the art, to restrict unauthorized access to the individual servers and nodes.

Referring back to FIG. 2, at a step 38, DPKPS or other keying material (e.g., a portion of the pairwise key) is associated with each role ID and stored (i.e., saved in memory or written to disk) in the clinicians' PDAs. At a step 39, initial role IDs and the associated default rights are stored in each node 7, 8, 10, 12, 14, 16, 18 and 20. The data stored in the nodes 7, 8, 10, 12, 14, 16, 18 and 20 with respect to the initial roles corresponds to the role oriented data stored in the PDAs.

Figure 3:
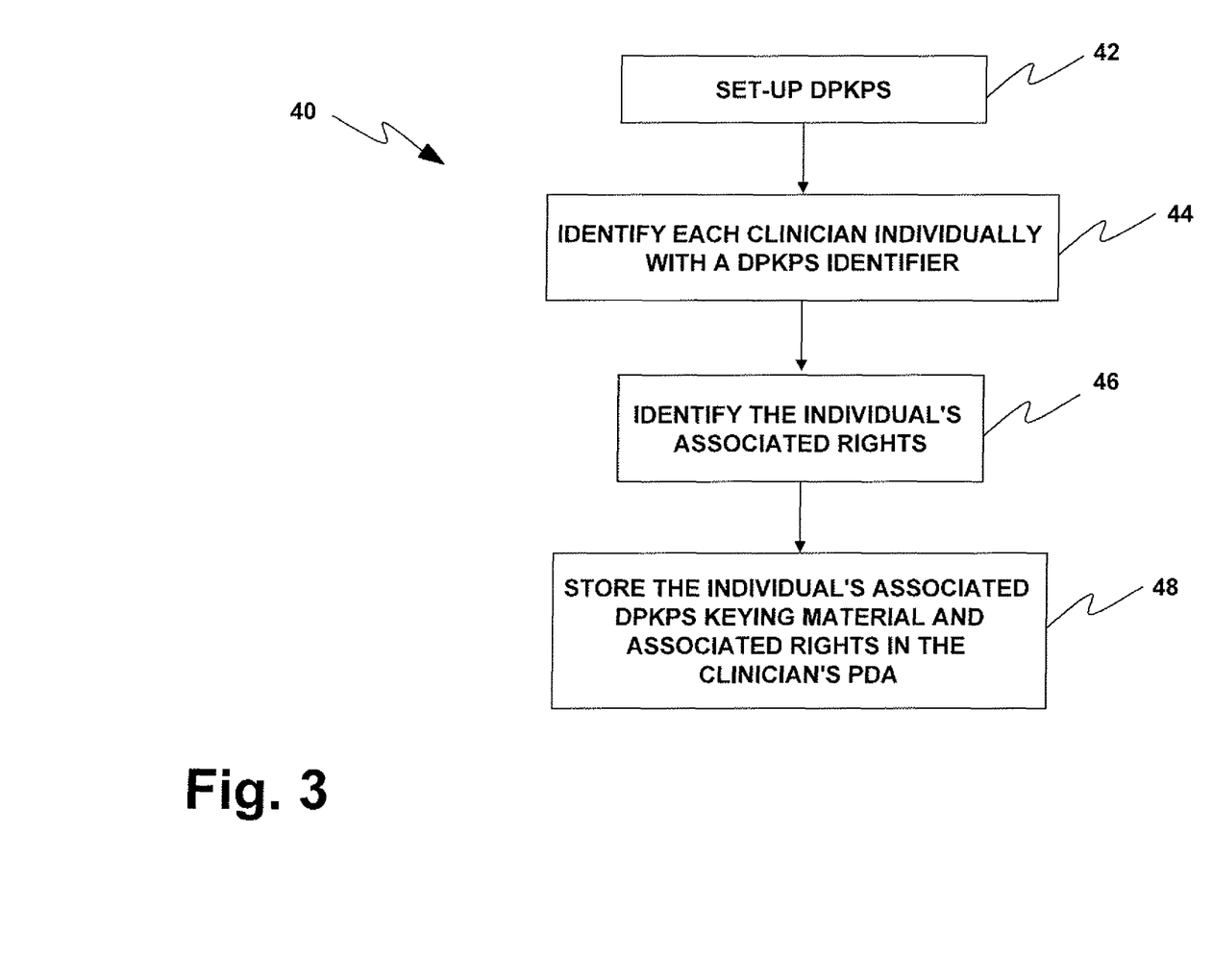
FIG. 3 illustrates a method to perform initial set-up of individual clinician accounts, in which rights are granted to the individual clinician accounts to provide access to resources in body system networks.

FIG. 3 illustrates a method 40 to perform initial set-up of individual clinician accounts, in which rights are granted to the individual accounts to provide access to resources, particularly in the BSNs 22, 24, and 26. At a step 42, proper setup of the DPKPS or other keys is verified. At a step 44, each clinician to have access to the system 2 is identified individually with a DPKPS or other identifier. For each clinician identified, at a step 46, the particular individual's associated rights are identified. At a step 48, the individual's newly determined associated rights and the associated DPKPS or other keying material are stored in the clinician's PDA.

Continuing Configuration of Advanced Access Control System

Clinicians often work in teams including other clinicians of like responsibilities (e.g., a team of doctors, or a team of nurses). It is often useful to allow all authorized members of a particular clinician's team to automatically be granted all appropriate privileges to all appropriate BSNs 22, 24, and 26. In some instances, the team members can be identified based on a common role that has been granted to them. For example, if a particular clinician is a cardiologist, and the authorized members of the team, to which this particular clinician belongs, are cardiologists, they all might be granted the "cardiologist" role. According to some embodiments, all clinicians that are assigned the cardiologist role are automatically granted rights based on their teammate's rights—this scheme is referred to as a horizontal granting of rights.

Figure 4:
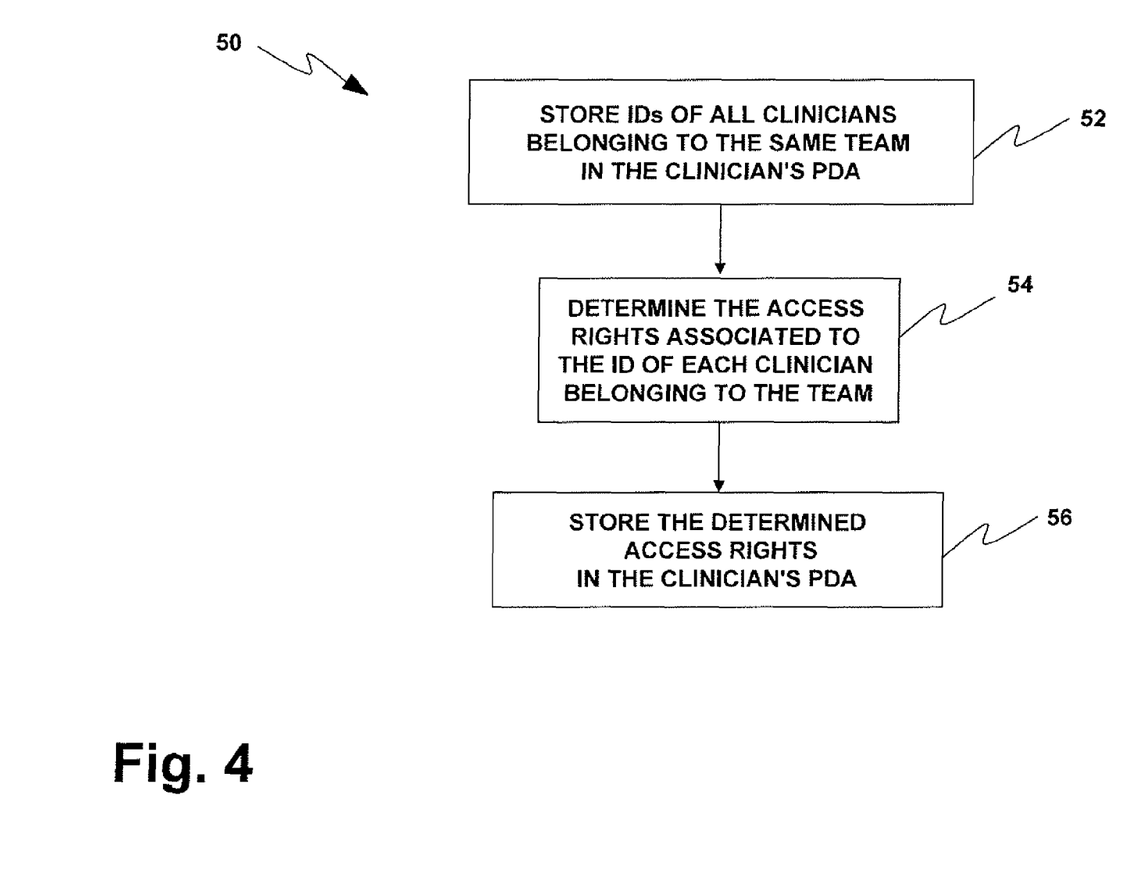
FIG. 4 illustrates a method to perform the horizontal granting of rights for access to resources in body system networks, in which rights are granted from a particular clinician to other authorized clinicians belonging to the particular clinician's team.

FIG. 4 illustrates a method 50 to perform the horizontal granting of rights for access to resources in the BSNs 22, 24, and 26 stemming from a particular clinician to other authorized clinicians belonging to that particular clinician's team. At a step 52, the IDs of the clinicians belonging to the team of the authorized clinician are stored in the clinician's PDA.

At a step 54, the access rights associated with the IDs of each clinician belonging to the team are determined based on a lookup of the authorized clinicians list 5. The rights may have been granted to the clinician as directly granted individual rights or as rights granted to a role, which was in turn granted to the clinician. Finally, at a step 56, the newly determined rights are stored in the PDAs of the clinicians to whom the rights have been horizontally granted.

Continuing Configuration of Advanced Access Control System

Some embodiments provide facilities to manage changes within the system 2 as it evolves due to personnel changes (e.g., clinician team changes) or nodal changes (e.g., adding, removing or modifying nodes 7, 8, 10, 12, 14, 16, 18 and 20) or any other changes. For example, if a particular clinician decides to resign from a particular hospital, the access rights of the clinician are revoked from the system 2. Alternatively, new clinicians may join the clinician team and the appropriate access rights (via individual access rights and roles) can be established. Additionally, if another clinician acquires additional expertise, his/her access rights may be increased accordingly.

The clinicians' PDAs (or other such devices used to access the BSNs 22, 24, and 26) are regularly updated with the latest changes in the authorized clinicians list 5. In one aspect, the clinicians' PDAs perform "synching" operations during which the lockups against the authorized clinicians list 5 the requested via regular connections with the access rights server 6 (or directly to the authorized clinicians list 5 for embodiments not utilizing the access rights server 6).

The following are some exemplary tasks performed during synching operations:
1. Upgrading and downgrading of access rights stored in the PDA to reflect the most current rights granted to an associated ID of each existing clinician in the team.
2. Storing IDs (excluding the associated keying material) in the PDA of new clinicians joining the team.
3. Storing in the PDA the access rights associated with the ID of each new clinician joining the team.
4. Removing from the PDA access rights associated with the ID of each clinician leaving the team.

In this manner, the access rights are monitored and automatically updated in a timely manner. This is especially important as the hospital environment is continually evolving, for example with the resident rotations.

Supervised Association of Nodes to a Body Sensor Network

During patient set-up procedures, to prepare the patient for monitoring, a clinician attaches two or more nodes 7, 8, 10, 12, 14, 16, 18 and 20 to the patient. The symmetric keying and association of the two or more nodes 7, 8, 10, 12, 14, 16, 18 and 20 leads to the formation of the BSN 22, 24, and 26.

During the deployment phase, the creation of the BSN 22, 24, and 26 includes two steps. In a first step, the role of the clinician performing the patient set-up is identified. In a second step, a determination is made whether a corresponding role ID of the identified role of the clinician is authorized to set-up a new BSN 22, 24, and 26. During each of the above steps, the authorized clinicians list 5 is referenced to retrieve the applicable data. It is also contemplated that the nodes associate by verifying the information stored in each node, e.g. the keying material and identifiers. Alternatively, the nodes associate via the control device 30 wearable by the patient 29.

Body Sensor Network Security Domain

After a particular BSN 22, 24, and 26 is formed, it can only be accessed and reconfigured by individuals with accounts that have been assigned the "set-up" role (also referred to as the "super" role). In one embodiment, the set-up role is assigned to information technology administrators or hospital administrators. In another embodiment, the set-up role is assigned to certain clinicians, such as team leaders or managing clinicians. Aside from granting access to the BSNs 22, 24, and 26, the set-up role can also be used to reconfigure the BSN 22, 24, and 26 as required—e.g., adding nodes, removing nodes, changing node settings, etc.

In operation, the functions performed by the set-up role include at least the following: First, it allows the selection of a set of roles and individual clinician IDs and associate access rights to the respective roles and IDs. Second, the authorization information corresponding to the roles and IDs selected is downloaded to the appropriate nodes 7, 8, 10, 12, 14, 16, 18 and 20 within the BSN 22, 24, and 26.

Body Sensor Network Access Control

Figure 5:
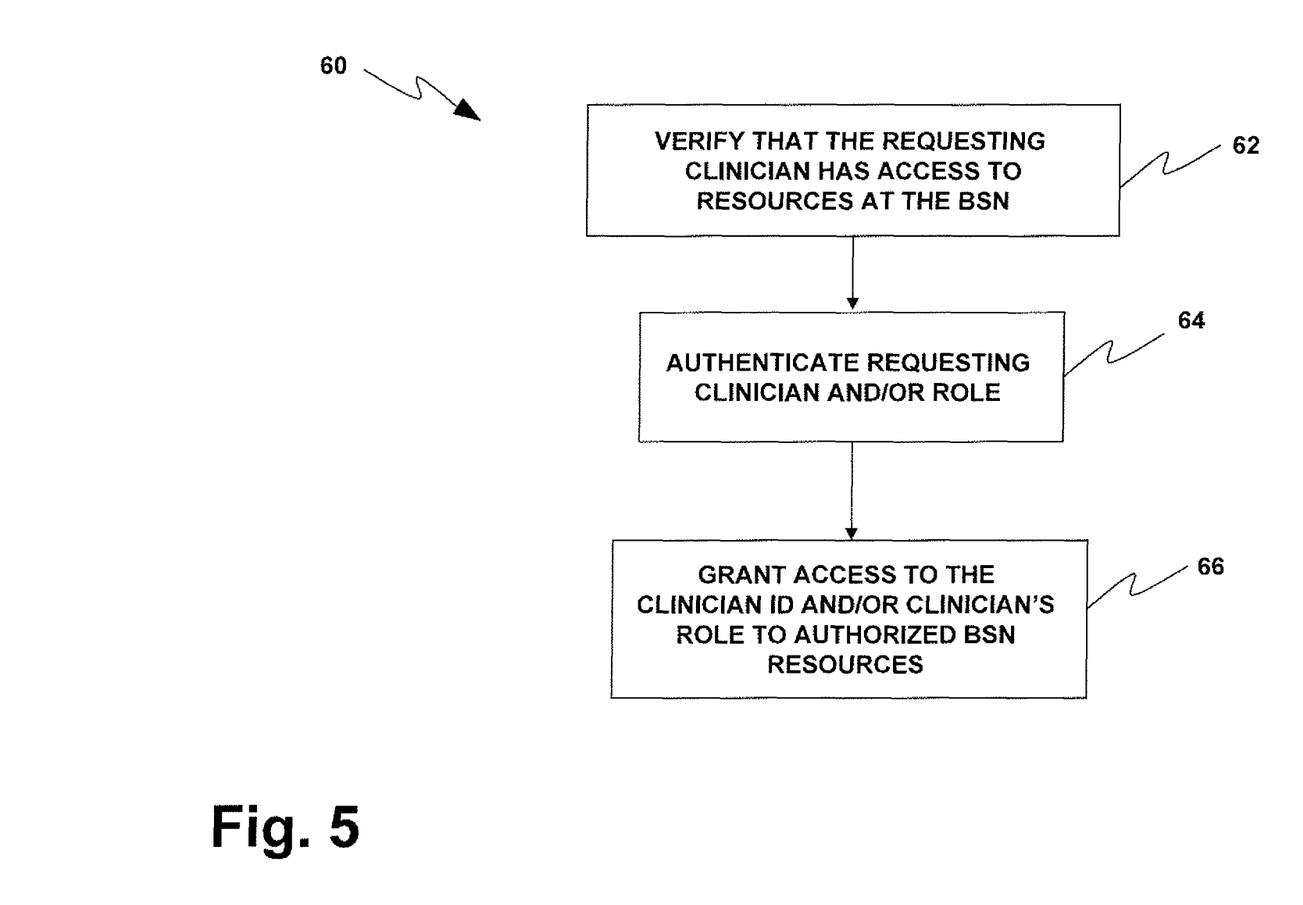
FIG. 5 illustrates a method for performing body sensor network access.

FIG. 5 illustrates a method 60 for performing a controlled body sensor network access. At a step 62, a lookup against the authorized clinicians list 5 is performed based on the requesting clinician's ID to ensure the clinician has access to the BSN 22, 24, and 26. Additionally, lookups are performed based on roles that are assigned to the requesting clinician. Next, at a step 64, the requesting clinician's ID and any roles that have been assigned to the clinician are authenticated. Upon the successful completion of the previous steps, at a step 66, access is granted to the requesting clinician to access those resources of the BSN 22, 24, and 26 for which the authorization has been granted.

As described above, mobile sensors and devices achieve an ad hoc supervised association into a network. An ad hoc list of authorized users is secured. The external users can access the network and network devices in a controlled manner.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of using a secure nodal network, comprising:
   assigning a requesting entity and a second entity to a first team;
   verifying that the requesting entity has the proper access rights to at least a portion of the secure nodal network;
   authenticating the requesting entity in accordance with a key pre-distribution scheme;
   querying a list including security metadata to determine if the requesting entity has proper access rights;
   in response to querying results being positive, granting a first access right to the requesting entity;
   submitting a query to determine whether the requesting entity and the second entity have been assigned to a common team; and
   in response to the query being positive, determining that the requesting and second entities are on the common team and automatically granting the second entity the first access right to the portion of the secure nodal network.

2. The method according to claim 1, further including:
   establishing the secure nodal network by:
   defining and utilizing a key pre-distribution scheme;
   defining roles each configured to provide one or more access rights to a group;
   associating roles with corresponding access rights; and
   granting each role to one or more entities within the secure nodal network.

3. The method according to claim 2, further including:
   granting roles on a patient by patient basis.

4. The method according to claim 2, further including:
   establishing and granting a set-up role to set-up clinicians which set-up role enables the set-up clinicians to grant access rights to other clinicians and other roles.

5. The method according to claim 4, further including:
   automatically updating the list including security metadata with metadata corresponding to rights granted via the set-up role to other clinicians or other roles.

6. The method according to claim 1, further including:
   integrating into the secure nodal network one or more nodes configured to provide data collection and data transfer functionality;

operatively connecting the nodes;
forming one or more body sensor networks;
collecting data with the node; and
transferring the collected data to one or more other nodes in the secure nodal network.

7. The method according to claim 1, further including:
implementing the secure nodal network in a hospital.

8. The method according to claim 1, further including:
assigning a first role to the requesting entity and the second entity;
assigning the requesting entity a second access right to at least one additional portion of the nodal network;
submitting a second query to determine whether the requesting entity and the second entity have been assigned a common role; and
in response to the second query being positive, automatically granting the second entity the second access right to the at least one additional portion of the nodal network.

9. The method according to claim 1, further including:
automatically updating one or more network access devices used by members of the team of the requesting entity.

10. The method according to claim 9, wherein at least one network access device includes a personal digital assistant.

11. The method according to claim 1, further including:
automatically updating the list including security metadata with role assignments and team assignments.

12. A secure wireless network comprising:
a network including one or more wireless nodes; and
a list including security metadata, the metadata describing access rights or groups of access rights granted to a first entity within the wireless network or groups of entities within the wireless network, the list further including an assignment of the first entity and at least one additional entity to a common team; wherein the first entity is assigned a first role, and the at least one additional entity is assigned a second role; wherein disparate access rights to the at least one wireless node are automatically granted to the at least one additional entity when the at least one additional entity and the first entity are on the common team and the first role is different from the second role; and wherein the same access rights are automatically granted to the at least one additional entity and the first entity when the at least one additional entity and the first entity are on the common team and the first role is the same as the second role.

13. The secure wireless network according to claim 12, further including:
a set-up server that configures each wireless node with keying material before each node is deployed to the wireless network.

14. The secure wireless network according to claim 12, further including:
a body sensor network which includes the wireless nodes, operatively connected to a patient which nodes collect and transfer information related to the patient's health.

15. The secure wireless network according to claim 12, wherein the list including security metadata includes at least one of a text file including searchable data and one or more searchable data structures in a relational database.

16. The secure wireless network according to claim 12, further including:
an access rights server which manages query requests directed to the list including security metadata and updates the list including security metadata with role assignments and team assignments.

17. The secure wireless network according to claim 12, wherein the list including security metadata resides on at least one of an access rights server a set-up server and a patient control device.

18. The secure wireless network according to claim 17, wherein the patient control device is wearable.

19. The secure wireless network according to claim 12, further including:
one or more network access devices configured to be updated with data from the list including security metadata.

20. The secure wireless network according to claim 19, wherein the one or more network access devices includes at least one personal digital assistant (PDA).

21. The secure wireless network according to claim 12, further including:
mobile base stations that access data on and configure the BSNs.

22. A method of wirelessly monitoring patients in a medical environment, comprising:
providing one or more sensors to a patient to collect medical data to be monitored, the one or more sensors composing a body sensor network;
allowing access to the body sensor network to different groups defined by roles, the groups with different roles have different access rights, each role having an associated authenticating key identifier;
assigning a member to a group, the member automatically being granted the access rights associated with the role for the members of the group and the authenticating key identifier associated with the role; and
authenticating each member of the group and the associated role in accordance with the corresponding authenticating key identifier prior to allowing each member to access to the body sensor network.

23. The method according to claim 22, wherein the roles include at least one of:
an administrator role,
a physician role, and
a nurse role.

24. The method according to claim 23, further including:
defining each role by parameters; and
storing the defined roles in a table.

* * * * *